Sept. 5, 1950 L. BLOK ET AL 2,521,443

CIRCUIT FOR AMPLITUDE MODULATION

Filed Oct. 12, 1948

INVENTORS

JOHANNES MARINUS LODEVICUS JANSSEN

LOURENS BLOK

BY

AGENT

Patented Sept. 5, 1950 2,521,443

UNITED STATES PATENT OFFICE 2,521,443

CIRCUIT FOR AMPLITUDE MODULATION

Lourens Blok and Johannes Marinus Lodevicus Janssen, Eindhoven, Netherlands, assignors to Hartford National Bank and Trust Company, Hartford, Conn., as trustee Application October 12, 1948, Serial No. 54,076
In the Netherlands October 14, 1947

6 Claims. (Cl. 332—64)

Figure 1:
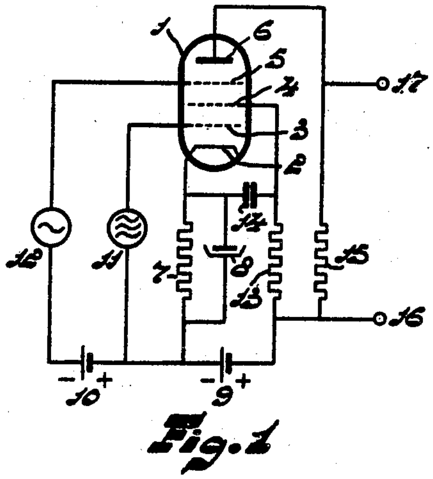

This invention relates to circuit-arrangements for amplitude modulation.

A known circuit-arrangement for amplitude modulation comprises a pentode in which a carrier signal is applied between the control-grid and the cathode and a modulating signal is applied between the suppressor grid and the cathode. This method of modulation is referred to as suppressor-grid modulation, and it is based on the action exerted by the suppressor grid on the current distribution between the anode and the screen grid, this action being referred to as the current-distribution control. The high-frequency carrier current which is modulated by the low-frequency modulating signals is developed in both the screen-grid circuit and the anode circuit in such manner that, to a first approximation, the sum of the amplitudes of the high-frequency currents occurring at the same instant in the two circuits is constant. The modulating voltage thus acts in an opposite sense upon the high-frequency currents flowing through the two circuits. A modulated high-frequency voltage may be taken from a load resistance included in the anode circuit. However, in this arrangement the disadvantage arises that there is a low-frequency voltage produced across the output resistor due to the modulating voltage. This unwanted low-frequency voltage may be separated from the desired modulated high-frequency voltage by supplying the voltage taken from the resistance to a filter suitable for this purpose, or by substituting for the load resistance included in the anode circuit a parallel resonant circuit which is tuned to the frequency of the high-frequency signals. Such a resonant circuit has a high impedance for the modulated high-frequency signals, but a negligible impedance for the undesired low-frequency signals.

However, the use of a filter or of a tuned circuit requires additional component parts. If the frequency of the high-frequency oscillations is adjustable, as in the case of generators for measuring purposes, the filter or the circuit will frequently be constructed to be tunable. In this case each new adjustment of the frequency of the high-frequency oscillations also requires re-adjustment of the tuned position. This implies a complication of the control, if it is to be carried out manually, or a complication of the device if the control is carried out automatically. Use might be made of filters having a large band-width, or of a high-pass filter, so that tuning is not required. However, in this case the suppression of the unwanted signals is unsatisfactory, unless the filter is complicated and consequently expensive.

The object of the invention is to provide a new circuit-arrangement of the kind described, in which the filter or the tuned circuit is dispensed with.

For this purpose the invention is based on a circuit-arrangement in which a high-frequency carrier signal is applied between the control-grid and the cathode of an electric discharge tube and a low-frequency signal is applied between the cathode and a further grid controlling the current distribution between two further electrodes. The modulated high-frequency voltage is derived from a load resistance included in the supply current circuit of either of the two further electrodes, which circuit is connected to the cathode. The invention is characterized in that the latter electrode is connected to the other of the two further electrodes through a resistance of the same order of magnitude as the load resistance.

As will be seen hereinafter, the amplitude of the low-frequency voltage occurring across the load resistance is thus so small, relative to the mean amplitude of the modulated high-frequency voltage occurring across it, that further measures for suppressing the unwanted low-frequency voltage are not required or at least measures which are easier and cheaper to carry out are sufficient.

Figure 2:
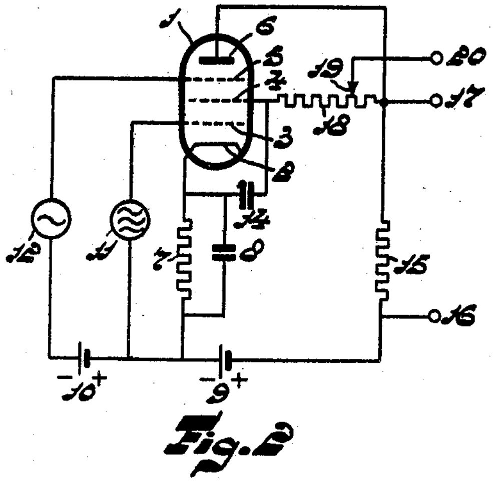

In order that the invention may be more clearly understood and readily carried into effect, it will now be described more fully by reference to the accompanying drawing, in which Fig. 1 shows a known circuit-arrangement, and Fig. 2 shows one embodiment of the circuit-arrangement according to the invention.

In the circuit-arrangement according to the invention as shown in Fig. 2, the circuit elements used in the same manner as those of Fig. 1 are designated by identical reference numerals. In Fig. 2, the cathode 2 of pentode 1 is connected through a cathode bias resistance 7 to the negative terminal of a direct voltage source 9. In order to avoid alternating voltage across the resistance 7, it is shunted by a by-pass condenser 8. The control-grid circuit comprises the high-frequency alternating voltage source 11, which supplies the voltage to be modulated. A negative bias voltage which is required for the adjustment of the current-distribution control is fed to the suppressor grid 5 by the voltage supply 10. The suppressor grid circuit furthermore includes a low-frequency alternating voltage supply 12 which furnishes the modulating voltage. The screen grid 4 is connected to the cathode 2 through a condenser 14.

This circuit-arrangement differs from that of Fig. 1 in that the anode 6 is connected to the screen grid 4 through a resistance 18. Furthermore the condenser 14, instead of being active, as in Fig. 1, for any alternating voltage occurring as a short-circuit relative to the resistance 18, is here chosen to be such that this action only applies to the high-frequency voltages, whereas for low-frequency voltages this condenser constitutes an impedance having a high value as compared with the load resistance 15.

The high-frequency current through the screen-grid circuits flows through the condenser 14 to the cathode 2, since this condenser presents to this current an impedance having a small value as compared with the value of the resistances 18 and 15. However, the low-frequency current of the screen-grid circuit flows substantially entirely through the resistances 18 and 15. Thus, the resistance 15 is traversed by the high-frequency current originating from the anode, the low-frequency current initiating from the anode, and the low-frequency current initiating from the screen-grid. The latter two currents are, however, in phase opposition and substantially balance one another entirely, since the sum of the instantaneous values of this current is substantially zero. Thus, the modulated high-frequency voltage desired may be taken from the terminals 16 and 17 without the need for further suppression of low-frequency voltages.

In order to achieve an optimum effect, the resistance 18 must be of the same order of magnitude as the resistance 15.

It has been found to be possible to omit the condenser 14 entirely. The useful output voltage is thus reduced, it is true, but a reduction of the undesired low-frequency components is still realized. This is particularly true if the resistance 18 is constructed as a potentiometer in a manner described more fully hereinafter.

In this circuit-arrangement the cathode by-pass condenser 8 is preferably so proportioned that the resistance 7 is substantially short-circuited for high-frequency voltages but is substantially unaffected for low-frequency voltages, since there is applied to the screen grid a low-frequency alternating current which acts upon the cathode current and would cause a small low-frequency alternating current to flow through the resistance 15. However, owing to the proportioning indicated for the condenser 8, feed-back occurs for the low frequencies and this feed-back counteracts the harmful effect of the low-frequency screen-grid alternating voltage.

It is found in practice that a small deviation occurs from the current distribution control described above, since the anode current slightly exceeds the screen-grid current, with the result that the low-frequency anode current and the low-frequency screen-grid current do not exactly neutralize one another and a small alternating voltage occurs across resistance 15 in phase with the low-frequency alternating anode current. Thus, the right-hand extremity of the resistance 18 exhibits a low-frequency alternating voltage relative to the terminal 16. The left-hand extremity of the resistance also exhibits a low-frequency alternating voltage relative to the terminal 16, but this has a high value and is in phase opposition with respect to that at the right-hand extremity. There is, consequently, somewhere on this resistance a point which has no low-frequency voltage with respect to the terminal 16. Consequently, the resistance 18 is preferably constructed as a voltage divider, for example as a potentiometer, the modulated high-frequency voltage desired being taken between the terminal 16 and the terminal 20 which is connected to the tapping point 19 on this potentiometer. If the resistance located between the tapping point and the anode, increased by the resistance 15, is related to the resistance 15 as the low-frequency alternating anode current is related to the low-frequency screen-grid current, only the desired voltage occurs between the terminals 16 and 20. The tapping point 19 may also be adjusted by experiment. This effect may be explained as follows. The low-frequency anode current only flows through the resistance 15. The voltage thus produced between the terminals 16 and 20 equals the product of the anode current and the resistance 15. The screen-grid current flows not only through the resistance 15, but also through the potentiometer 18; the voltage thus produced between the terminals 16 and 20 equals the product of the resistance located between the terminals and the low-frequency screen-grid current. If the two voltages, which are in phase opposition to one another, should neutralize one another, the proportion indicated must be fulfilled.

The invention may also be carried out with the use of tubes other than pentodes, such as hexodes, heptodes, octodes, in the modulation circuit-arrangements with current distribution control known for this purpose.

The circuit-arrangement according to the invention, which enables a modulated high-frequency voltage to be generated without the need for tuned circuits or filters is particularly useful when the frequency of the high-frequency voltage must be variable within broad limits, for example, in generators for measuring purposes, measuring transmitters and so-called standard signal generators.

What we claim is:

1. A circuit arrangement for producing amplitude modulation, comprising an electron discharge tube having in the order named a cathode, a control grid, first and second intermediary electrodes and an output electrode, means to apply a signal voltage to said control grid, means to apply a modulating voltage to said second intermediary electrode, a resistance load element having one end thereof connected to said output electrode, means to connect a voltage source to the other end of said load element, and a second resistance element interconnecting said output electrode and the said first intermediate electrode.

2. A circuit arrangement for producing amplitude modulation, comprising an electron discharge tube having in the order named a cathode, a control grid, first and second intermediary electrodes and an output electrode, means to apply a signal voltage to said control grid, means to apply a modulating voltage to said second intermediary electrode, a resistance load element having one end thereof connected to said output electrode, means to connect a voltage source to the other end of said load element, a second resistance element interconnecting said output electrode and the said first intermediate electrode, and a capacitor having a low impedance value at the frequency of said signal voltage and a high impedance value at the frequency of said modulating voltage interconnecting the said first intermediate electrode and the cathode.

3. A circuit arrangement for producing amplitude modulation, comprising an electron discharge tube having in the order named a cathode, a control grid, first and second intermediary electrodes and an output electrode, means to apply a signal voltage to said control grid, means to apply a modulating voltage to said second intermediary electrode, a resistance load element of given value having one end thereof connected to said output electrode, means to connect a voltage source to the other end of said load element, and a second resistance element having a value substantially equal to said given value interconnecting said output electrode and the said first intermediate electrode.

4. A circuit arrangement for producing amplitude modulation, comprising an electron discharge tube having in the order named a cathode, a control grid, first and second intermediary electrodes and an output electrode, means to apply a signal voltage to said control grid, means to apply a modulating voltage to said second intermediary electrode, a resistance load element having one end thereof connected to said output electrode, means to connect a voltage source to the other end of said load element, a second resistance element interconnecting said output electrode and the said first intermediate electrode, a bias resistance element connected to said cathode, and a capacitor shunting said bias resistance element, said capacitor having a low impedance value at the frequency of said signal voltage and a high impedance value at the frequency of said modulating voltage.

5. A circuit arrangement for producing amplitude modulation, comprising an electron discharge tube having in the order named a cathode, a control grid, first and second intermediary electrodes and an output electrode, means to apply a signal voltage to said control grid, means to apply a modulating voltage to said second intermediary electrode to produce a modulating current flow in said first intermediate electrode and said output electrode, a resistance load element having one end thereof connected to said output electrode, means to connect a voltage source to the other end of said load element, a second resistance element interconnecting said output electrode and the said first intermediate electrode and having a tapping, and means to couple an output circuit between said tapping and the said other end of said load element, the sum of the said load resistance and of the resistance between said tapping point and the anode having a ratio relative to the said load resistance substantially equal to the ratio of the modulating current in said output electrode to the modulating current in said first intermediate electrode.

6. A circuit arrangement for producing amplitude modulation, comprising an electron discharge tube having in the order named a cathode, a control grid, a screen grid, a suppressor grid and an anode, means to apply a signal voltage to said control grid, means to apply a modulating voltage to said suppressor grid, a resistance load element having one end thereof connected to said anode, means to connect a voltage source to the other end of said load element, and a second resistance element interconnecting said anode and the said screen grid.

LOURENS BLOK.
JOHANNES MARINUS LODEVICUS JANSSEN.

REFERENCES CITED

The following references are of record in the file of this patent:

UNITED STATES PATENTS

| Number | Name | Date |
|---|---|---|
| 2,224,690 | Moodey et al. | Dec. 10, 1940 |
| 2,278,159 | Wheeler | Mar. 31, 1942 |